(Model.)
J. W. McKNIGHT.
ARTIFICIAL STONE, TILE, AND MARBLE.
No. 247,262. Patented Sept. 20, 1881.
Fig. 1.
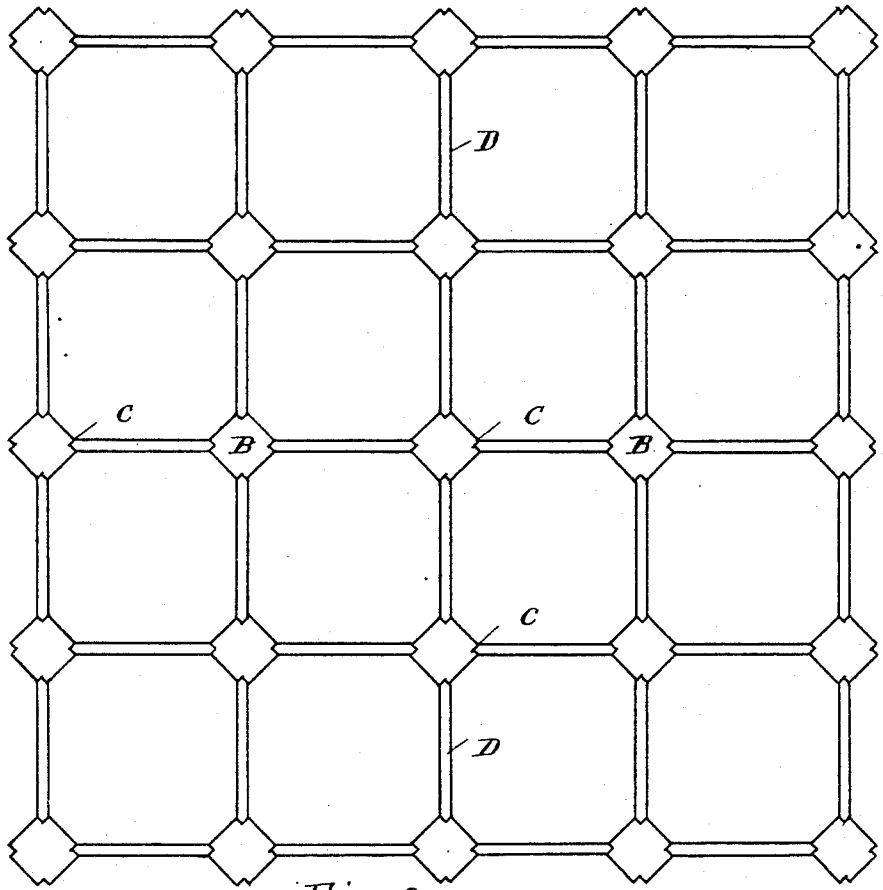
Fig. 2.     Fig 3.
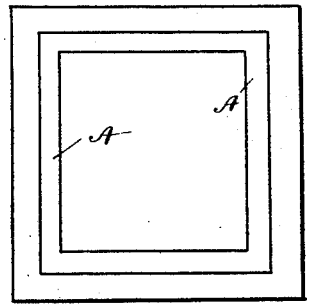 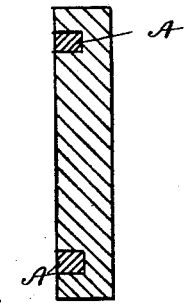
Witnesses,
Edwin L. Yewell,
Chas. L. Coombs.
Inventor.
John Wesley McKnight,
By C. M. Alexander
his Atty.

UNITED STATES PATENT OFFICE.

JOHN W. McKNIGHT, OF WASHINGTON, DISTRICT OF COLUMBIA.

ARTIFICIAL STONE, TILE, AND MARBLE.

SPECIFICATION forming part of Letters Patent No. 247,262, dated September 20, 1881.

Application filed August 19, 1881. (Model.)

*To all whom it may concern:*

Be it known that I, JOHN WESLEY MC-KNIGHT, of Washington, in the county of Washington, and in the District of Columbia, have invented certain new and useful Improvements in Artificial Stones, Tiles, and Marble; and I do hereby declare that the following is a full, clear, and exact description thereof, reference being had to the accompanying drawings, and to the letters of reference marked thereon, making a part of this specification.

This invention relates to certain improvements in the manufacture of artificial stones, tiles, and marble, and to an improved method of laying the same; and it has for its objects to produce a strong and durable material for such purposes which will possess the characteristics of natural stone in the highest degree, which will have sufficient hardness to adapt it to purposes where it will be subjected to the greatest wear and tear—such as pavements and the like—and which will be capable of taking a perfect polish, and may be superficially ornamented to adapt it to building purposes, as more fully hereinafter specified.

In the drawings, Figure 1 represents a plan view, showing my improved method of laying the artificial stone, tile, or marble. Fig. 2 represents a view of a slab constructed according to my invention, and Fig. 3 represents a sectional view of the slab.

In carrying out my invention I take the following ingredients and combine the same in about the proportions named, viz: borax, one pound; sulphur, two pounds; caoutchouc, one pound; zinc-white, one pound; litharge, one pound; Iceland moss, one pound; shellac, three pounds; isinglass, one-half pound; plumbago, one pound; oxide of iron, one pound; glycerine, one quart; muriatic acid, a sufficient quantity; alum, three pounds; carbonate of ammonia, three pounds.

The insoluble substances composing the ingredients above mentioned are thoroughly comminuted or pulverized, and the soluble substances composing the ingredients are dissolved to saturation in their proper solvents, which will consist, respectively, of water, naphtha, alcohol, or ether. The ingredients are then thoroughly commingled and conglomerated, forming the compound to be employed in the formation of the improved stone, tile, or marble.

This compound, when required for use, is employed in the proportion of one quart of said compound to one hundred gallons of water, (more or less.) I then take ten parts (more or less) of silicious sharp sand or gravel and one part of Portland or other cement. The said gravel and cement are thoroughly dampened with the prepared compound, which is in a state of solution, and the whole is commingled so as to form a plastic or semi-plastic mass. I then place the mass in suitable molds and tamp or otherwise compress it therein. The mass is allowed to set, being dampened occasionally, for three or four days, according to the climate, with the compound, the object being to fill all the pores with the compound, to render the finished stone impervious to water and impenetrable to the elements; hence obviating the necessity of surface painting or coating hitherto found necessary where porous building materials are employed.

For the different imitations of marble I place upon a slab of glass or any other suitable smooth surface the above-mentioned compound, combined with a suitable quantity of Keen's or other suitable cement or plaster, in a plastic state, to the extent of from about an eighth to a quarter of an inch in thickness. I then take up the surface-moisture of the mass after it has been properly leveled by sifting upon the surface a suitable quantity of dry cement, the superfluous portions being afterward brushed off or otherwise removed. The surface is then scored by means of a suitable instrument, so as to form a series of indented lines, similar to the veins of Italian or other marble, after which the lines are filled with the compound and cement suitably colored to imitate the veins of such marbles. After the whole sets or hardens the slab is polished in the usual way.

When it is desired to produce ornamental or other designs upon the surface of the finished slab the same is effected by placing below a sheet of glass the proper design, which may consist of a photograph, print, manuscript, letters, or sign, and I then trace upon the surface of the glass by means of a camel's-hair pencil or other suitable instrument the lines of the design with the compound above mentioned, suitably colored and thickened with cement, and when the same has properly set I apply the compound and cement before mentioned to the surface of the glass, covering the design produced thereon and embedding the same in the mass. When the whole has set and hardened the slab is removed, leaving the design beautifully set in the surface. The slab is then polished and finished as usual.

By this means it will be perceived that ornamental figures in innumerable varieties—such as pictures, geometrical designs, autographs, signs, and the like—may be produced upon the slab with the utmost facility and at a merely nominal cost.

Ornamental moldings may be formed upon the slab by forming suitable grooves or indentations at or near the edges or elsewhere in the surface of the slab while the mass is in a semiplastic state before setting, and by filling said grooves or indentations, as indicated by the letter A in the drawings, with the mass differently colored, so that the two portions, while in such plastic or semi-plastic state, will coalesce and unite, forming virtually a solid block or slab.

For the manufacture of paint the beforementioned compound is employed in connection with the gypsum or sulphate of lime in a natural state, the gypsum or sulphate of lime being placed in a suitable vessel or receptacle with the compound, and the whole allowed to remain until the gypsum or sulphate of lime is thoroughly disintegrated. The soluble or fluid portion of the material is then drawn off, leaving a residuum behind. By the action of the compound the crystalline structure of the gypsum or sulphate of lime will be destroyed, and the said gypsum or sulphate of lime will be left in such form as to be readily reduced to an impalpable powder, which, in combination with pulverized barytes or heavy spar, will form a valuable pigment. When such pigment, with a proper vehicle, is applied to any surface the gypsum or sulphate of lime, under atmospheric influences, will again assume its crystalline condition, forming a coating of extreme hardness and durability. Such paint will be found peculiarly adapted to exposed surfaces, as it is indestructible under the influence of fresh or salt water.

In applying my invention to paving purposes, I employ a series of blocks or slabs, B, of rectangular, polygonal, circular, or other shape. These are formed of the compound and cement, as hereinbefore described, and are provided at their corners or edges with angular or other shaped recesses, C, as indicated in the drawings. These blocks are laid, as indicated in the drawings, at suitable intervals apart, and from the recesses are extended strips D of cast-iron, slate, porcelain, glass, wood, or other suitable material. The intervening spaces between the blocks and strips are then filled with the compound cement, which may be colored in any suitable manner to form the pavement.

Having thus fully described my invention, what I claim, and desire to secure by Letters Patent, is—

1. A composition for artificial stone consisting of sand or gravel and Portland or other cement, combined with the liquid compound herein described in about the proportions set forth.

2. The compound herein described for coating artificial stone or other bodies in imitation of marble, the same consisting of Keen's or other similar cement combined with the liquid compound described and suitable pigments.

3. The method herein described of imitating marble, the same consisting of scoring the surface of the slab while in a plastic state, and filling the indented lines or scores and surface with compound cement suitably colored.

4. The method herein described of producing designs in imitation of marble, the same consisting in tracing or placing such designs with the compound cement described upon a sheet of glass, casting the slab thereon, and when sufficiently set removing the glass therefrom, substantially as set forth.

5. The method herein described of preparing an artificial marble pigment or paint, the same consisting in disintegrating gypsum or sulphate of alumina by means of the fluid or liquid compound herein described, drawing off the liquid portion, and drying and pulverizing the residuum, substantially as specified.

6. The concrete surface herein described, consisting of the molded blocks, having recesses at their edges, the strips secured in said recesses and extending from block to block, and the filling set in the intermediate spaces, substantially as specified.

In testimony whereof I affix my signature in presence of two witnesses this 19th day of August, 1881.

J. W. McKNIGHT.

Witnesses:
J. J. McCARTHY,
CHAS. D. DAVIS.